Nov. 17, 1959  E. J. HERBENAR  2,913,251
SELF-ADJUSTING PIVOT BUSHING FOR VEHICLE SUSPENSION
Filed Feb. 17, 1958
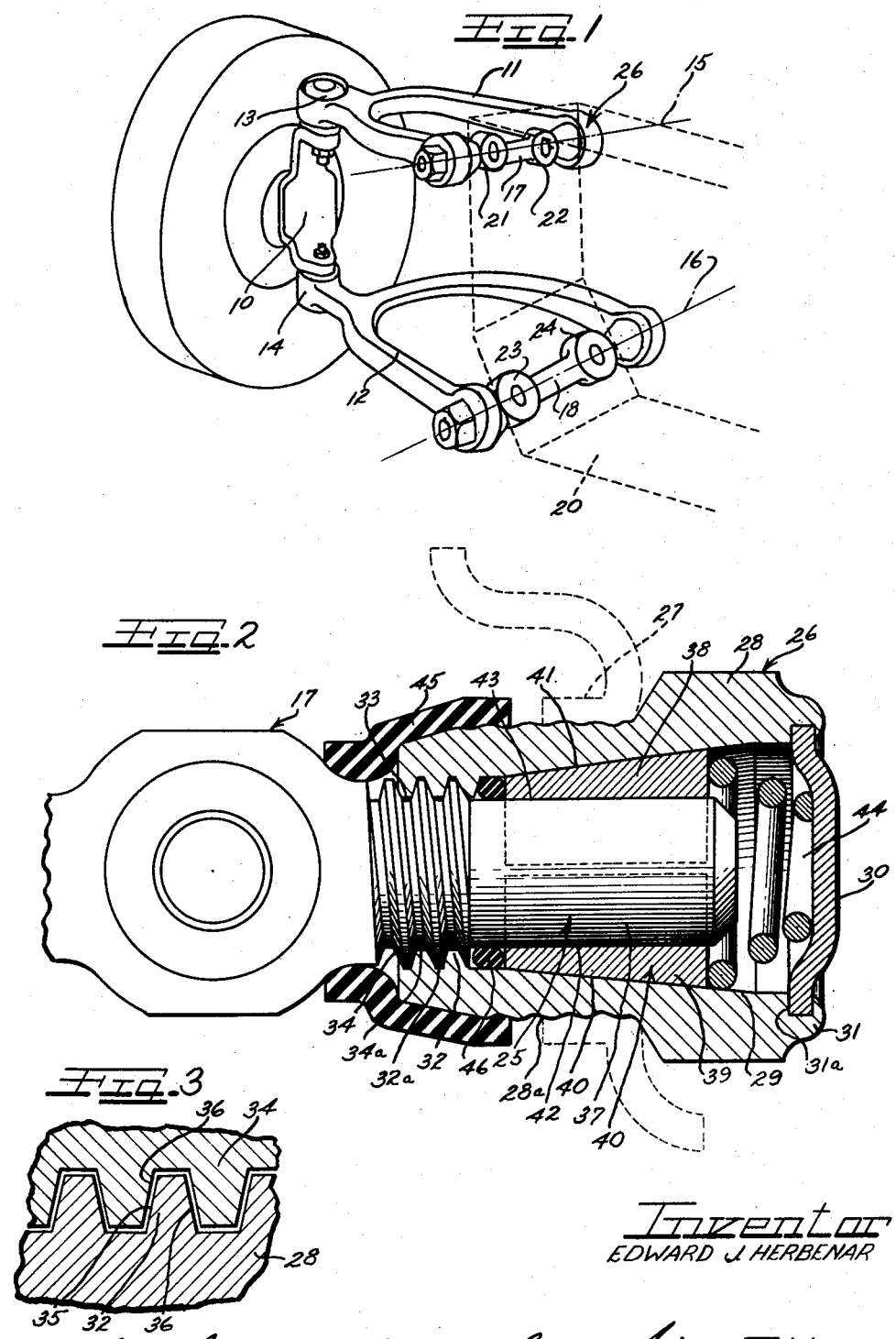
Inventor
EDWARD J. HERBENAR

United States Patent Office 2,913,251
Patented Nov. 17, 1959

2,913,251

SELF-ADJUSTING PIVOT BUSHING FOR VEHICLE SUSPENSION

Edward J. Herbenar, Detroit, Mich., assignor to Thompson Ramo Wooldridge Inc., a corporation of Ohio Application February 17, 1958, Serial No. 715,633

8 Claims. (Cl. 280—96.1)

This invention relates to a pivot bushing for use on an automotive steering linkage idler arm, or on the inner arm ends of an automotive suspension, and in particular to a pivot bushing which is useful in any application requiring a low friction bushing adapted to control both radial and axial movement.

In bushings of the type described which have been available heretofore, there has been no provision for compensating for the effect of wear resulting from radial loads on the bushing, and where threaded bushings have been used, axial loads have also produced undesirable stresses and wear. My invention provides for positive control of both relative axial and radial movement by means of a pair of non-metallic, low friction bearings having a predetermined taper toward an open end of the bushing, and biased toward the open end by spring means so as to take up radial loads on the bushing and to maintain a predetermined snug relationship between the bearings and a shaft received within the bushing.

In threaded bushings heretofore available, there has been no effective provision for misalignment and no means for take-up of wear induced by radial loads. Rubber bushings have not solved this problem because they increase the spring rate of the vehicle, due to torsional effects in the rubber, and are subject to distortion during use thereby varying the suspension geometry.

It is, accordingly, an object of the present invention to provide a bushing which is self-adjusting so as to take up wear due to radial loads thereon.

Another object of the invention is to provide a bushing as described having bearing means disposed therein which taper toward an open end of the bushing, the bearings being urged by resilient means into snug engagement with an inner surface of the bushing complementary to the tapered surface of the bearings, and with a cylindrical shaft in the bushing.

Another object of the invention is to provide a self-adjusting bushing which receives a shaft therein, as described, the portion of the bushing adjacent the open end thereof being in loosely threaded relationship with the shaft. This relationship affords control of lateral or axial movement without distortion of parts such as occurs in rubber bushings, so that slight misalignment of parts during manufacture is no longer productive of stress or wear in the system.

Another object of the invention is to provide a permanently lubricated bearing structure for taking up radial loads on the bushings, this structure being adapted to co-operate with the threaded structure hereinabove described to provide a constantly snug and uniformly positioned suspension pivot.

Another object of the invention is to provide a pivot bushing for use in combination with a vehicle suspension system in which upper and lower control arms have their outer ends pivotally secured to the upper and lower ends of a steering knuckle, the control arms being bifurcated and connected by the said pivot bushings to a shaft for each of the arms which is disposed in axial alignment with the vehicle frame. The threaded relationship between the shaft and the pivot bushing, as above described, affords rotational movement of the control arm and the bushing relative to the shaft without wear, as a result of the relatively loose relationship between the bushing and the shaft in their threaded portions, and also permits slight movement of the control arm in the horizontal plane, without the hazard of misalignment or distortion encountered where rigid bushings or rubber bushings of the usual type have been used.

Another object of the invention is to provide a pivot bushing as described in which seal means are disposed between the bushing and shaft in order to seal in lubricant which may be used in the bushing and to seal out extraneous material, the seal at the same time permitting slight axial movement of the shaft and bushing relative to one another.

Other objects and advantages of the invention will become apparent as the description proceeds in accordance with the drawings, in which:

Figure 1 is a perspective view of a vehicle suspension system utilizing the pivot bushing of the invention;

Figure 2 is an enlarged fragmentary view, partly in section of the control arm and shaft of the suspension system with which the pivot bushing is illustrated; and Figure 3 is an enlarged fragmentary vertical section of the relationship between the threaded portions of the bushing and the shaft respectively in accordance with the invention.

As may be seen from Figure 1, the invention may be used with the independent suspension of a front vehicle wheel, although it is equally suitable in other applications where control of relative axial and radial movement is needed between the bushing and the shaft received therein, and a conventional wheel support spindle 10 is universally pivotally carried by upper and lower control arms 11 and 12 by means of ball joints 13 and 14, respectively. The control arms 11 and 12 are in turn supported for pivotal movement about respective horizontally disposed axes 15 and 16 formed by shafts 17 and 18, which are rigidly secured at spaced intervals or points on a conventional transverse vehicle frame member 20. Each of the brackets or shafts 17 and 18 is provided with enlarged bosses 21 and 22 and 23 and 24 for connection with the frame 20 and has its outer ends such as the end 25 of the shaft 17 received in a pivot bushing assembly such as the pivot bushing assembly 26, as hereinafter further described.

The control arms 11 and 12 are bifurcated as shown and preferably stamped to provide an extension such as the extension 27 shown in dot and dash in Figure 2. This portion 27 is adapted to be threadedly engaged with a metal bushing 28 of the bushing assembly 26 which has an external surface 28a threaded as shown, although it will be understood that any other suitable manner of securing the support arms to the bushing assemblies is within the scope of the invention. The bushing 28 is provided with a bore 29 extending axially therethrough and tapering inwardly from an end wall 30 held by a rolled in edge 31 of the bushing against a shoulder 31a thereof. The front portion of the bushing 28 is threaded internally by several threads 32 adjacent the open end 33 of the bushing, as hereinafter described.

In order to control relative axial movement between the shaft 17 and the bushing 28, such as would be produced by slight horizontal movement of the control arm 11, the shaft is provided with a threaded portion 34 adapted to be loosely engaged with the threaded portion 32 of the bushing 28. This loose engagement which affords axial movement as described is accomplished in the embodiment shown by providing a root diameter for the threaded portion 32 of the bushing 28 which exceeds the maximum diameter of the threaded portion 34 of the shaft 25 by an amount substantially greater than the normal tolerance between such threads. The threads 32 and 34 are tapered and are preferably frusto-conical in cross-section, so that impact between the inclined side walls 35 and 36 of the threads 32 and 34 is reduced by a radially outward component of the resultant stress. The extension 25 of the shaft 17 has its cylindrical portion 37 held by the threaded portion 34 in predetermined axially spaced relationship to the end wall 30 to permit the said axial movement of the bushing relative to the shaft and the threaded portion 34 may have three or four turns to afford some rotational adjustment, such as would ordinarily produce torsional strain in rubber bushings or some degree of binding in threaded bushings of the conventional type.

In order to take up radial loads which are directed against the shaft 25 through the bushing 26, a pair of low friction, non-metallic bearings 38 and 39 are provided which are formed of a substantially self-lubricating material such as a high molecular weight polyamide such as "nylon," or polyethylene or one of the phenolic resins. The bearings 38 and 39 each have an outer surface 40 and 41 respectively, tapered inwardly at an angle corresponding to the inclination of the inner surface 29 of the bushing 26 and an inner surface, such as the surfaces 42 and 43, having a radius corresponding to the radius of the cylindrical shaft portion 37 and adapted to fit snugly thereagainst. The bearings 38 and 39 are each biased toward the open end of the bushing 26 by means of a helical spring 44 having one end seated in a slightly dished portion of the end wall 30 and the other end bearing against the inner ends of the bearings 38 and 39, as shown.

The inclination of the bearings 38 and 39 at their outer surfaces is such that ordinary loads do not move the bearings axially against the spring, and hence the spring 44 will not become fatigued. However, when the bearings become worn over an extended period of use, their effective diameter will be reduced, which would normally lead to an undesirable amount of play and vibration such as would interfere with proper steering. This is prevented by means of the spring 44, which urges the bearings constantly into snug engagement with the shaft extension 25 and the bushing 28 in a self-adjusting action which maintains a firm bearing relationship between the parts and greatly extends the life of the bushing.

In bushings of the threaded type, it is desirable to provide a certain amount of lubrication, and in the bushing assembly 26, this lubrication is effectively sealed in by means of a flexible rubber seal 45 which fits snugly over the bushing 28 and the mating shaft 17 while affording a certain degree of relative movement between the bushing 26 and the shaft rotationally and axially. The lubricant is retained in the threaded portions 32 and 34 by an O-ring or resilient annular seal 46 disposed between the ends of the bearings 38 and 39 and the said threaded portions 32 and 34.

The self-adjusting characteristic of the bushing assembly 26 assures that radial loads thereon will always be taken up effectively between the cylindrical portion 37 of the shaft extension 25 and the said bearings 38 and 39. There is thus no need for radial load to be taken up at the threaded portion of the bushing; and the threaded portions 32 and 34 are, accordingly, dimensioned to be loosely received radially with respect to the roots 34a and 32a respectively. Consequently, wear on the bearings 38 and 39 will be relatively even, and there will be little or no interference with the above-described axial movement between the shafts and the bushing 28.

There has thus been provided a self-adjusting pivot bushing which is simple in construction and requires a minimum of replacement, but which maintains a firm support for the shaft despite any wear in the bearings. The bushing is effective to take up both radial loads and axial movement produced by control arms such as the arms 11 and 12, without any danger of the misalignment of parts or excessive vibration.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. A self-adjusting pivot bushing comprising a bushing having an open, internally threaded end portion and an inner surface tapering axially outwardly from said threaded portion, a shaft extending into said bushing having an externally threaded portion received in loosely fitted relationship in the internally threaded portion of said bushing and bearing means on said shaft tapering toward the open end portion of said bushing and biased into snug engagement with said shaft and said tapered inner surface of said bushing whereby to afford a self-adjusting movement of said bearing means toward said open end of said bushing in response to wear in said bearings which may be produced by radial loads on said bushing.

2. In a self-adjusting bushing assembly, a bushing having an open end, a shaft disposed in loosely threaded engagement with said bushing to control slight relative axial movement between said bushing and shaft, said bushing defining an inner surface tapering toward said open end, a pair of bearings in said bushing each having an outer surface complementary to the inner surface of said bushing and an inner surface adapted to fit snugly upon an inner end of said shaft and means urging said bearings toward the open end of said bushing whereby to maintain said snug relation between said bushing and said shaft.

3. A bushing assembly for controlling axial and radial motion comprising a bushing open at one end and defining an internally threaded portion adjacent said open end and an inner surface tapering toward said threaded portion, a shaft received in said bushing defining a threaded portion adapted to engage loosely with the threaded portion of said bushing to afford slight axial movement relative to said bushing and having a cylindrical portion extending into said bushing from said threaded portion, bearing means in snug engagement with the tapered inner surface of said bushing and the cylindrical portion of said shaft to support radial loads on said bushing, and means urging said bearing means toward said open end of said bushing, whereby to adjust the axial position of said bearings in response to wear which may be induced therein.

4. In combination with a vehicle suspension system, a pair of control arms each having an outer end joined to an end of a steering knuckle for the vehicle and a pair of inner ends, a shaft for connecting the inner ends of each of the arms, said shafts being disposed substantially in parallel axial alignment on the vehicle frame, a pivot bushing for each of the inner ends of each of the arms in loosely threaded engagement with an end of the shaft associated therewith to provide controlled relative axial movement between said bushing and said shaft and bearing means in said bushing providing controlled radial movement between said bushing and said shaft.

5. In combination with a vehicle suspension system having a pair of control arms having an outer end and a pair of inner ends, a shaft for each of the control arms, the shafts being secured in substantially parallel relationship and in axial alignment to the vehicle frame, each end of each of the shafts being threaded externally, a pivot bushing for each of the ends of each of the arms having a portion in engagement with the control arm end associated therewith, said bushing having an internally threaded portion adjacent an open end thereof adapted to receive an end of the shaft associated with said bushing in loosely threaded engagement for slight axial movement therebetween and an inner surface tapering toward said threaded portion, and a pair of bearings in snug engagement with said inner surface of said bushing and with said shaft and biased toward the open end of said bushing to afford firm support for radial loads placed on said bushing.

6. In combination with a vehicle suspension system having a pair of control arms each having an outer end and a pair of inner ends, a shaft for each of the control arms, the shafts being secured in substantially parallel relationship and in axial alignment to the vehicle frame, each end of each of the shafts being threaded externally, and a pivot bushing for each of the ends of each of the arms having an internally threaded portion adjacent an open end thereof adapted to receive an end of the shaft associated therewith in loosely threaded engagement to limit relative axial movement therebetween, said bushing having an inner surface tapering toward said threaded portion and a pair of bearings in snug engagement with said inner surface and said shaft and biased toward said open end.

7. A pivot bushing assembly for affording axial and radial movement comprising a metal bushing defining an internal bore tapering toward an open end of the bushing and a threaded portion adjacent said open end, a shaft extending into said bore and having a threaded portion in loose engagement with the threaded portion of said bushing to afford relative axial movement therebetween, a pair of non-metallic low friction bearings tapering toward said open end in complementary relation to the taper of said bushing, resilient means disposed in sealing relationship between said shaft and said bushing and between the ends of said bearings and said threaded portions of said bushing and shaft and spring means urging said bearings axially against said resilient means and into snug engagement with said bushing with a strength sufficient to resiliently support said bearings axially against radial thrust exerted thereagainst and to maintain substantially uniform support for said bearings despite slight wear therein.

8. A self-adjusting bushing assembly comprising a bushing having an open end, a shaft in said bushing extending through said open end, a pair of bearings each having an exterior surface tapering inwardly toward said open end and an interior surface in snug engagement with said shaft, said bushing defining an inner surface complementary to said bearings, and means urging said bearings toward said open end, said bushing defining an internally threaded portion adjacent the open end of said bushing, the threads of said threaded portion having inwardly inclined side walls, said shaft defining a threaded portion complementary to said bushing and adapted to engage loosely therein whereby to control axial movement between said shaft and said bushing and maintain said bearings in constantly snug relationship to said shaft and said bushing.

References Cited in the file of this patent
UNITED STATES PATENTS

| | | |
|---|---|---|
| 1,852,320 | Leighton | Apr. 5, 1932 |
| 2,016,757 | Tyron | Oct. 8, 1935 |
| 2,210,535 | Hallanger | Aug. 6, 1940 |
| 2,299,935 | Slack et al. | Oct. 27, 1942 |
| 2,443,822 | Hall | June 22, 1948 |
| 2,635,927 | Leighton | Apr. 21, 1953 |
| 2,795,412 | Waisner | June 11, 1957 |